UNITED STATES PATENT OFFICE.

JAMES M. BOTTUM, OF NEW YORK, N. Y.

COMPOSITION FOR STIFFENING HAT-BODIES.

Specification forming part of Letters Patent No. 43,176, dated June 21, 1864.

*To all whom it may concern:*

Be it known that I, JAMES M. BOTTUM, of the city, county, and State of New York, have invented certain new and useful improvements in a substance for stiffening hat-bodies or any article requiring such substance for that purpose; and I do hereby declare that the following is a full and clear and exact combination of the materials to be used, reference being had to the samples accompanying this specification.

The object of this invention is to make a cheaper and better substance than gum-shellac dissolved with alcohol only, making a saving in the cost of the substance to produce the same result at least forty per cent.

To enable others to mix the materials to manufacture the substance for use, I will proceed to state the quantity of each and how mixed. The materials to be used are ultramarine, shellac or gum-shellac, and alcohol. Mix as follows: three ounces ultramarine, three ounces shellac or gum-shellac, and five ounces of alcohol, (ninety per cent.,) and when dissolved is ready for use.

Having thus described how and in what proportions the materials are to be mixed, I claim—

The combination of the materials named for the mixture, as herein specified, to stiffening hat-bodies or for any other articles where the same result is required.

JAMES M. BOTTUM.

Witnesses:
SAML. GARDINER,
W. J. KANE.